United States Patent
Nauka et al.

(10) Patent No.: US 10,766,246 B2
(45) Date of Patent: Sep. 8, 2020

(54) ADDITIVE MANUFACTURING

(71) Applicant: Hewlett-Packard Development Company, L.P., Houston, TX (US)

(72) Inventors: Krzysztof Nauka, Palo Alto, CA (US); Sivapackia Ganapathiappan, Los Altos, CA (US); Lihua Zhao, Sunnyvale, CA (US); Howard S. Tom, San Jose, CA (US); Yan Zhao, Palo Alto, CA (US); Hou T. Ng, Campbell, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 249 days.

(21) Appl. No.: 15/518,477

(22) PCT Filed: Dec. 15, 2014

(86) PCT No.: PCT/US2014/070396
§ 371 (c)(1),
(2) Date: Apr. 11, 2017

(87) PCT Pub. No.: WO2016/099445
PCT Pub. Date: Jun. 23, 2016

(65) Prior Publication Data
US 2017/0274593 A1    Sep. 28, 2017

(51) Int. Cl.
*B29C 64/10* (2017.01)
*B33Y 50/02* (2015.01)
(Continued)

(52) U.S. Cl.
CPC ........... *B33Y 50/02* (2014.12); *B29C 64/153* (2017.08); *B29C 64/165* (2017.08);
(Continued)

(58) Field of Classification Search
CPC ..... B29C 64/165; B29C 64/153; B29C 64/20; B29C 64/386; B29C 64/393; B29C 67/04;
(Continued)

(56) References Cited

U.S. PATENT DOCUMENTS 4,398,952 A * 8/1983 Drake .................. B22F 7/06
228/176
5,660,621 A    8/1997 Bredt
(Continued)

FOREIGN PATENT DOCUMENTS

JP    2000-190086    7/2000
JP    2000-272018    10/2000
(Continued)

OTHER PUBLICATIONS

International Search Report and Written Opinion for International Publication No. PCT/US2014/070396 dated Jul. 22, 2015, 13 pages.
(Continued)

*Primary Examiner* — Jacob T Minskey
*Assistant Examiner* — Cedrick S Williams
(74) *Attorney, Agent, or Firm* — Dierker & Kavanaugh PC

(57) ABSTRACT

In one example, a non-transitory processor readable medium with instructions thereon that when executed cause an additive manufacturing machine to partially or completely bury a part in layers of molten build material.

10 Claims, 16 Drawing Sheets

(51) Int. Cl.
*B33Y 10/00* (2015.01)
*B29C 70/68* (2006.01)
*B29C 64/165* (2017.01)
*B29C 64/153* (2017.01)
*B29C 64/386* (2017.01)
*B33Y 30/00* (2015.01)
*B29K 77/00* (2006.01)

(52) U.S. Cl.
CPC ............ *B29C 64/386* (2017.08); *B29C 70/68* (2013.01); *B33Y 10/00* (2014.12); *B33Y 30/00* (2014.12); *B22F 2998/00* (2013.01); *B29K 2077/00* (2013.01)

(58) Field of Classification Search
CPC .... B22F 3/1055; B22F 3/12; B22F 2003/145; B22F 7/06; B22F 7/062; B22F 7/08
See application file for complete search history.

(56) References Cited

U.S. PATENT DOCUMENTS

| | | | |
|---|---|---|---|
| 6,363,606 | B1 | 4/2002 | Johnson, Jr. et al. |
| 6,375,874 | B1 | 4/2002 | Russell et al. |
| 7,974,727 | B2 | 7/2011 | Silverbrook |
| 8,070,473 | B2 | 12/2011 | Kozlak |
| 2002/0145213 | A1* | 10/2002 | Liu ................ B33Y 70/00 264/40.1 |
| 2004/0145629 | A1 | 7/2004 | Silverbrook |
| 2006/0244169 | A1 | 11/2006 | Monsheimer et al. |
| 2007/0071902 | A1 | 3/2007 | Dietrich et al. |
| 2007/0238056 | A1 | 10/2007 | Baumann et al. |
| 2008/0111271 | A1 | 5/2008 | Khoshnevis |
| 2009/0173443 | A1* | 7/2009 | Kozlak ............... B29C 64/135 156/303.1 |
| 2009/0177309 | A1* | 7/2009 | Kozlak ............... B33Y 30/00 700/119 |
| 2014/0268604 | A1* | 9/2014 | Wicker ............... B29C 70/885 361/760 |
| 2014/0283104 | A1* | 9/2014 | Nilsson ............... G06F 21/10 726/26 |
| 2016/0332373 | A1* | 11/2016 | Kuhn ................ B33Y 70/00 |
| 2017/0021571 | A1* | 1/2017 | Haga ................. B33Y 30/00 |
| 2017/0157852 | A1* | 6/2017 | Ederer ............... B28B 1/001 |

FOREIGN PATENT DOCUMENTS

| | | |
|---|---|---|
| JP | 2005-007572 | 1/2005 |
| JP | 2006-511365 | 4/2006 |
| JP | 2007-534524 | 11/2007 |
| JP | 2009-519564 | 5/2009 |
| KR | 2007-0005000 | 11/2005 |
| WO | WO-2005011959 | 2/2005 |
| WO | WO-2013163585 | 10/2013 |
| WO | WO-2014077848 | 5/2014 |
| WO | WO-2014/152884 | 9/2014 |

OTHER PUBLICATIONS

Bayless, J. et al., "Wire Embedding 3d Printer", (Research Paper), Apr. 12, 2010, http://www.reprap.org/mediawiki/images/2/25/Spool_Head_FinalReport.pdf., 45 pages.

International Search Report and Written Opinion for International Application No. PCT/US2014/070396 dated Jul. 22, 2015, 13 pages.

* cited by examiner

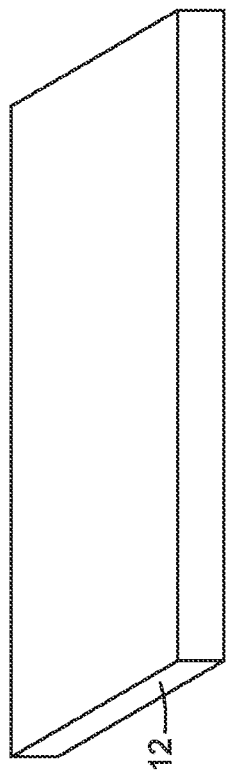
FIG. 1A
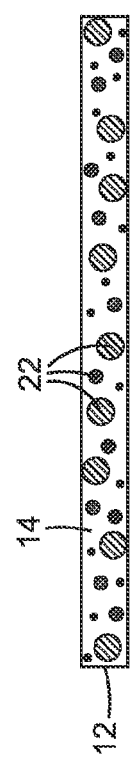
FIG. 1B
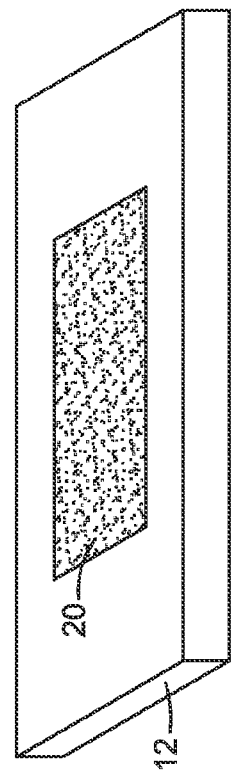
FIG. 2A
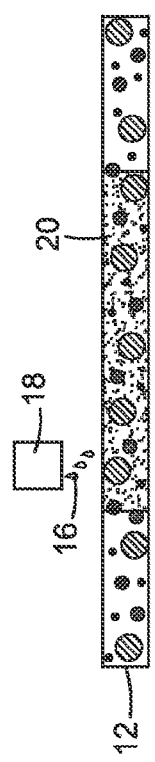
FIG. 2B
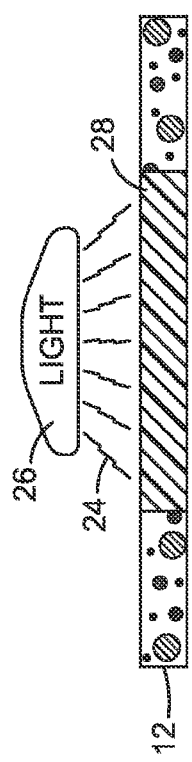
FIG. 3A
FIG. 3B

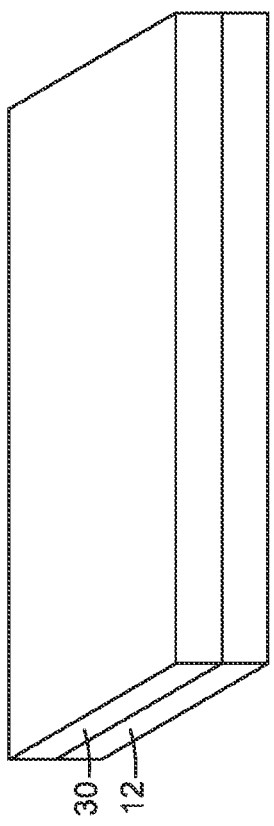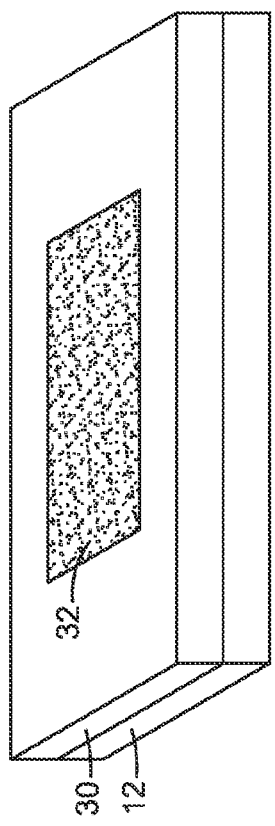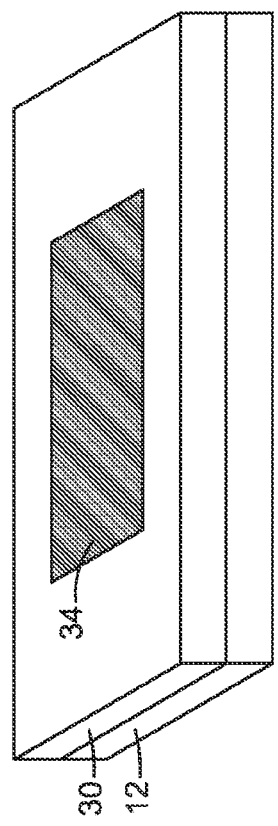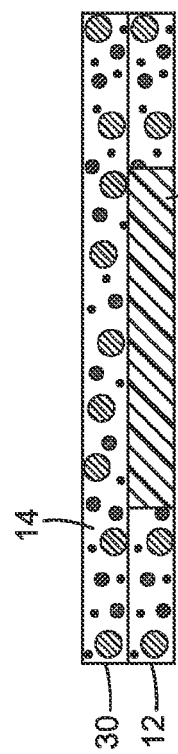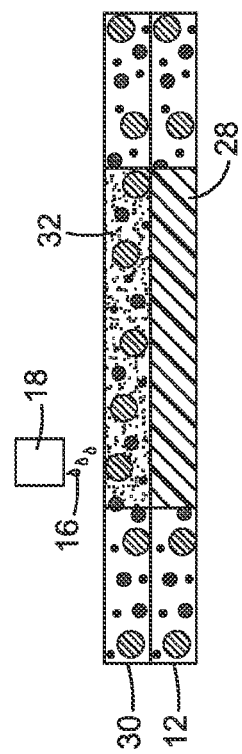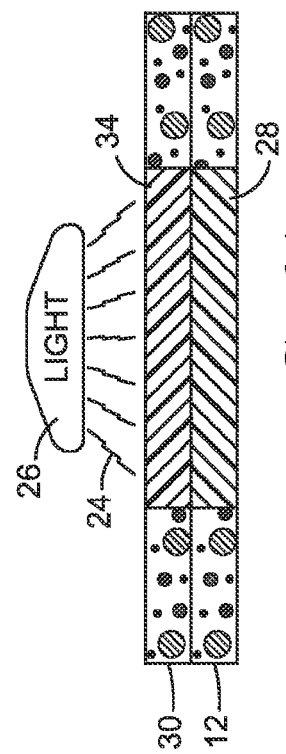

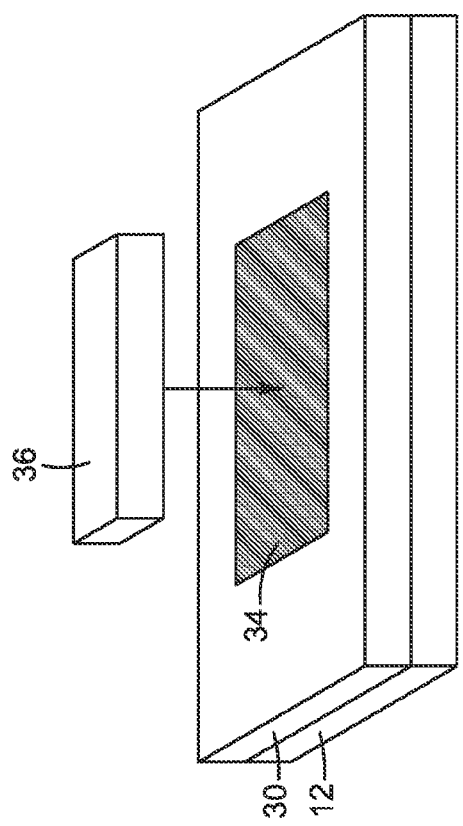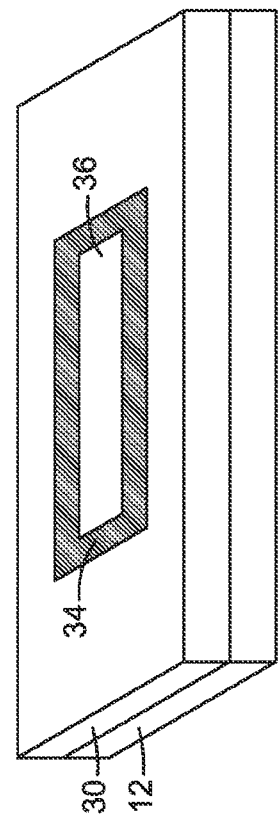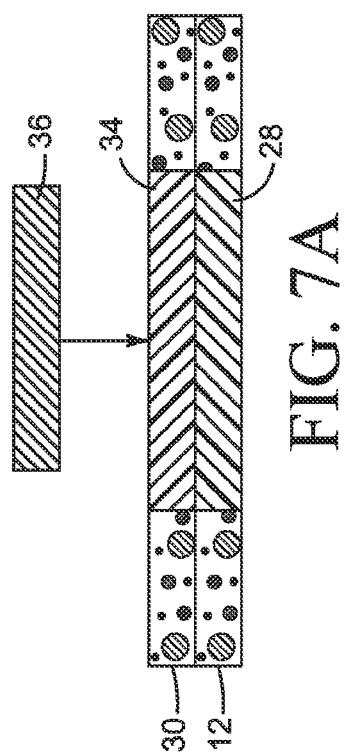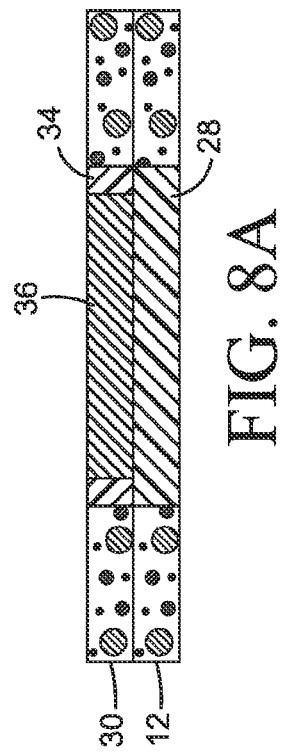

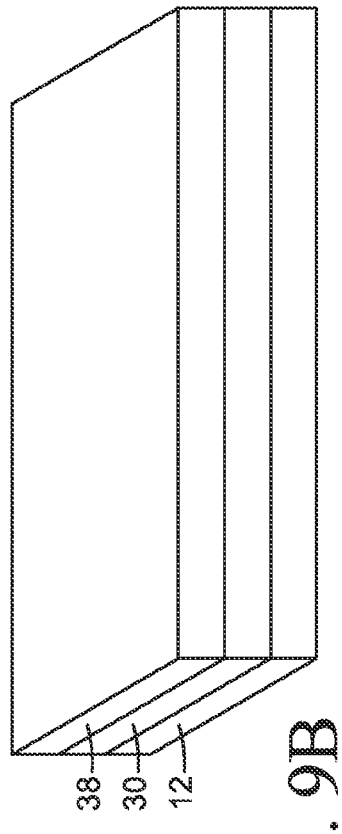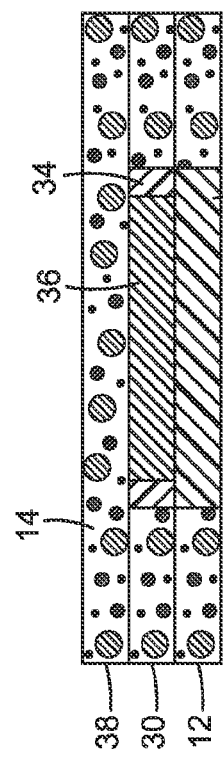
FIG. 9A  FIG. 9B
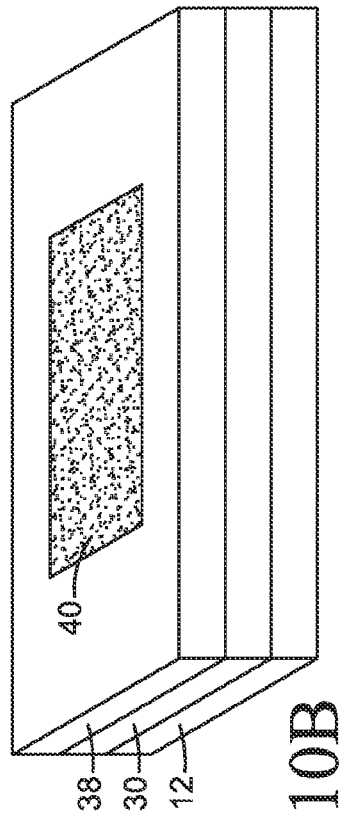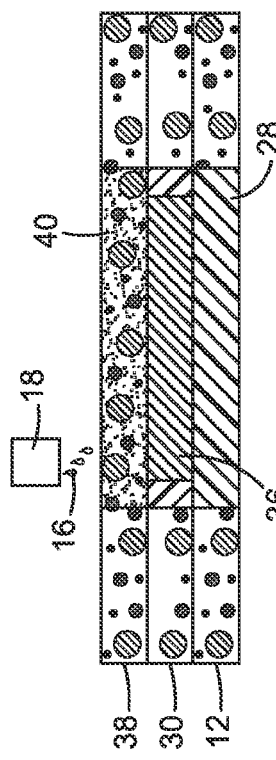
FIG. 10A  FIG. 10B
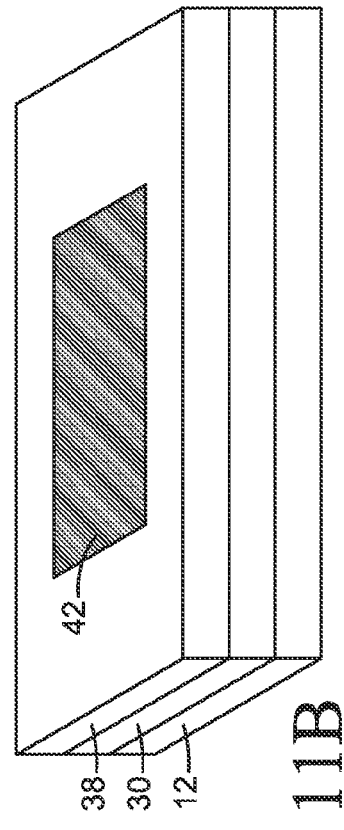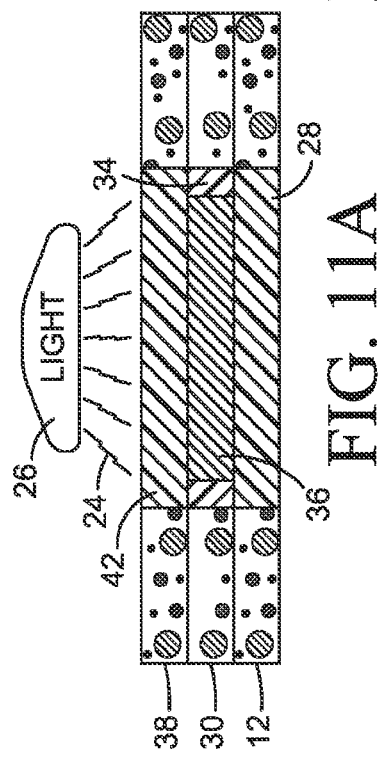
FIG. 11A  FIG. 11B

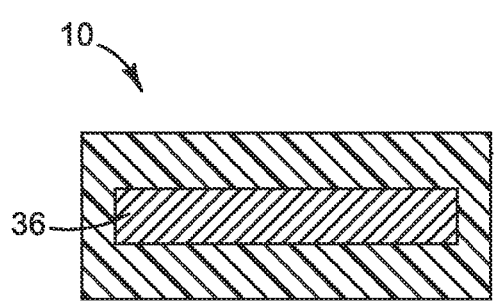
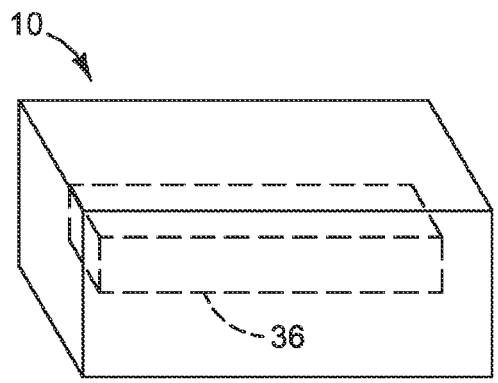
FIG. 12A  FIG. 12B
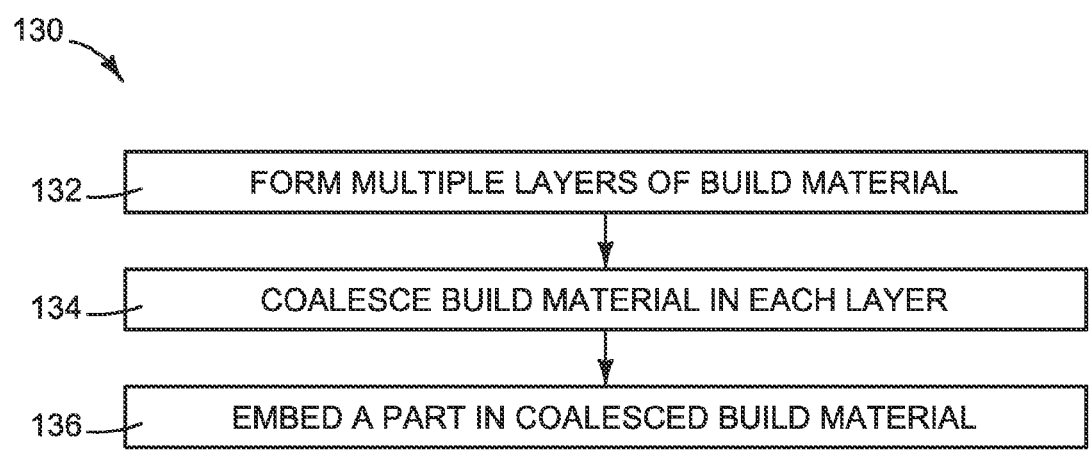
FIG. 14

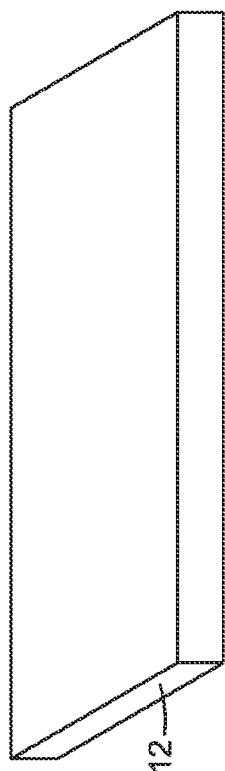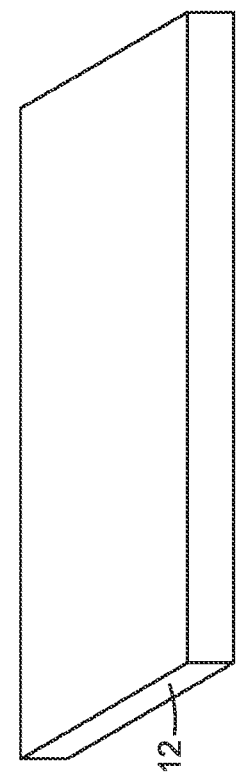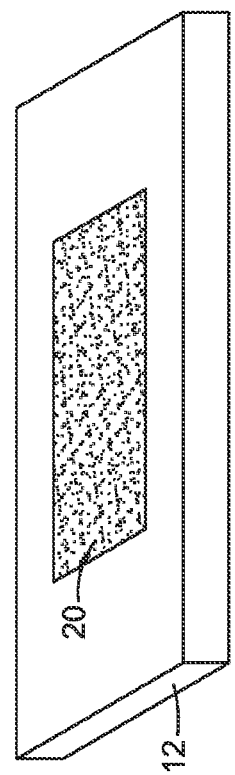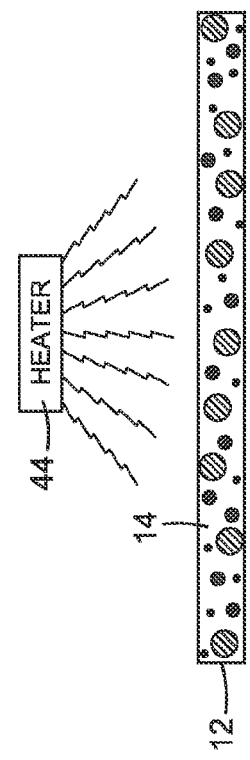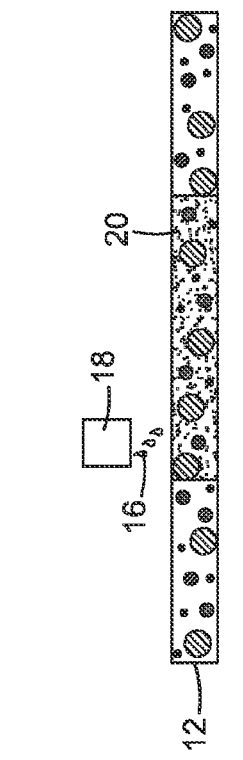

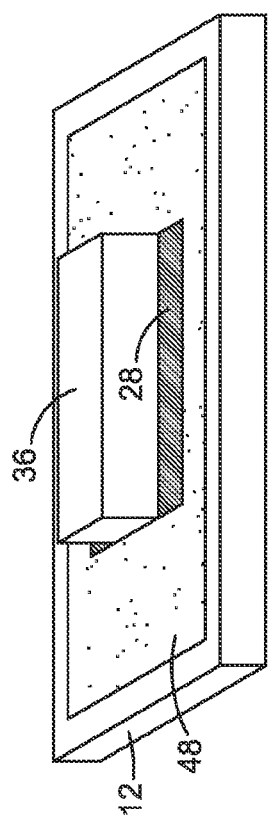
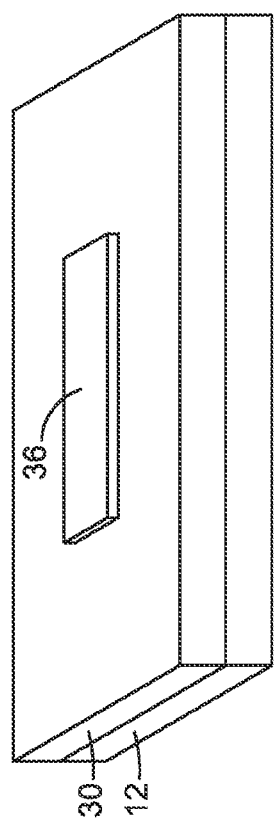
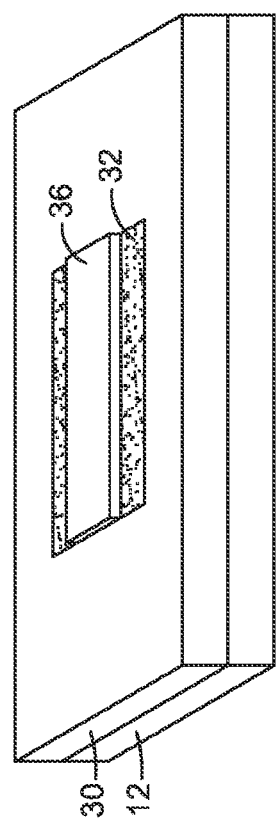
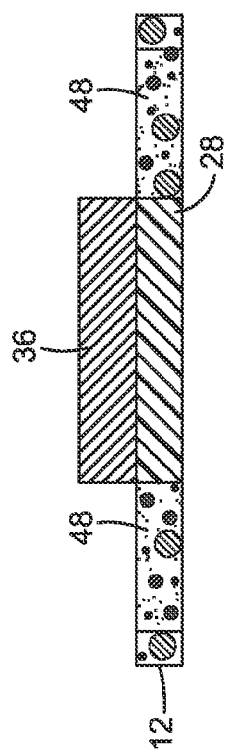
FIG. 21A
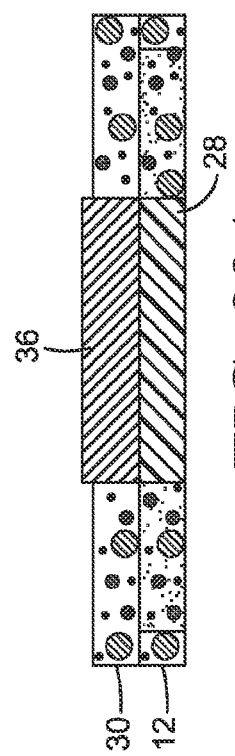
FIG. 22A
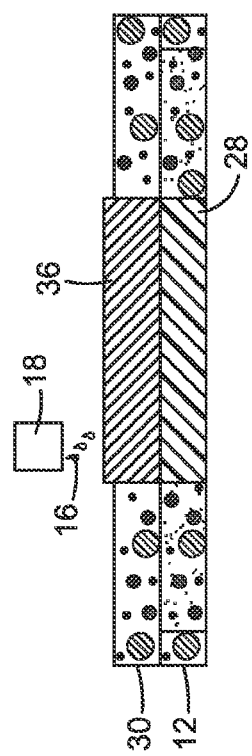
FIG. 23A

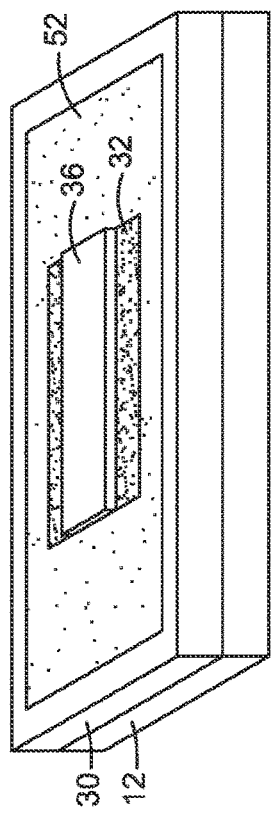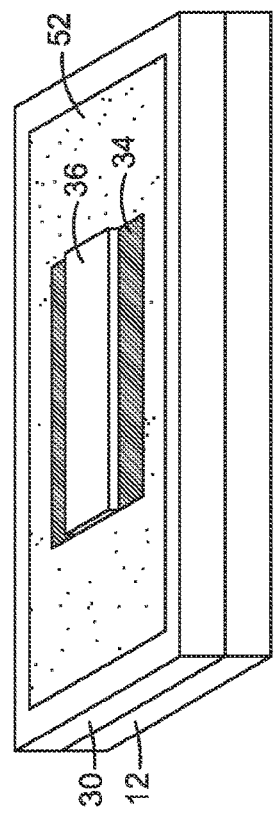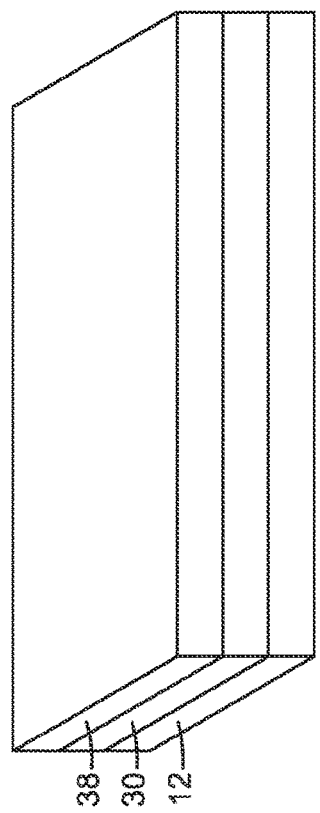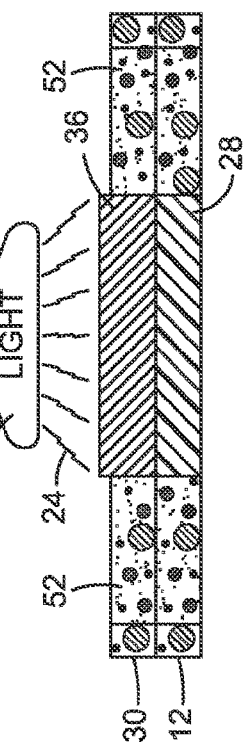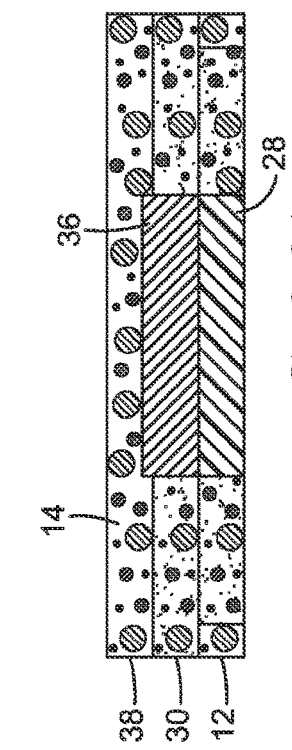

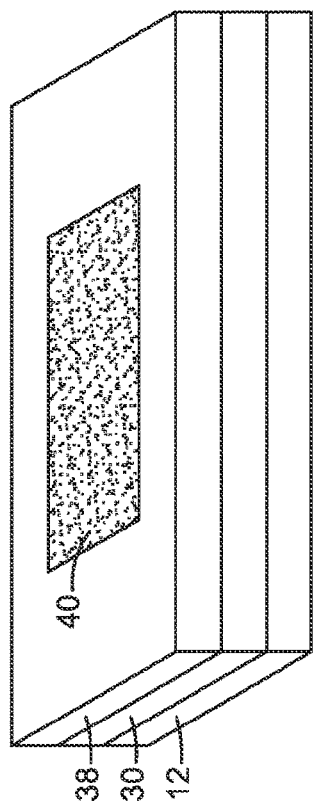
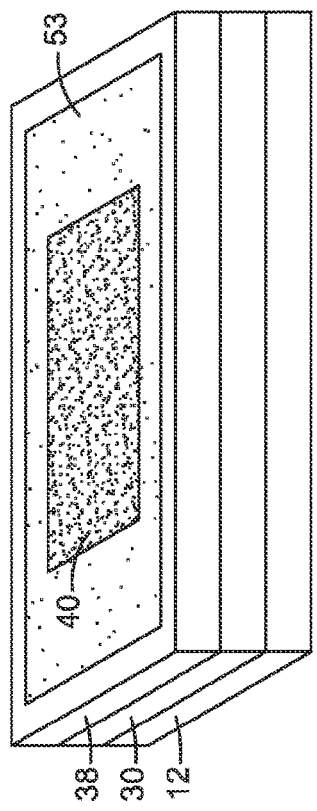
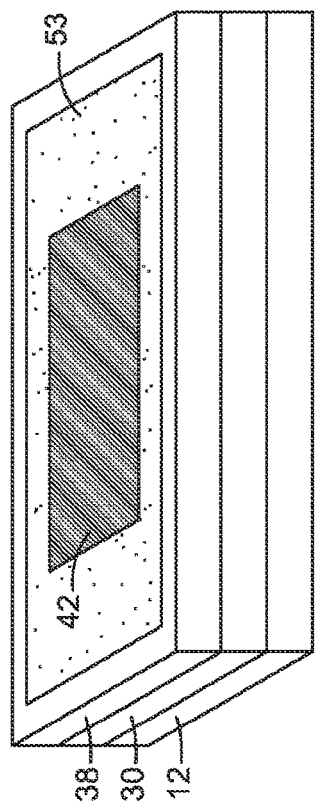
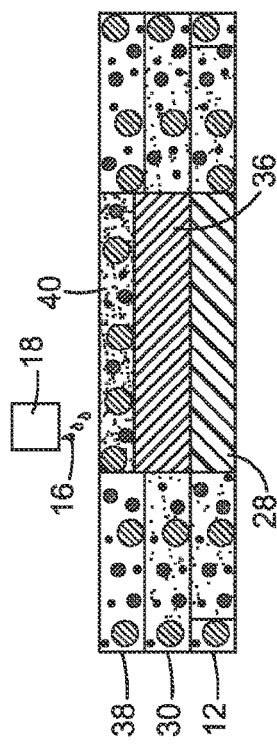
FIG. 27A
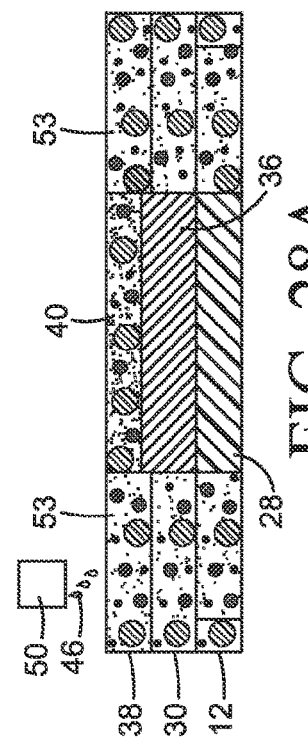
FIG. 28A
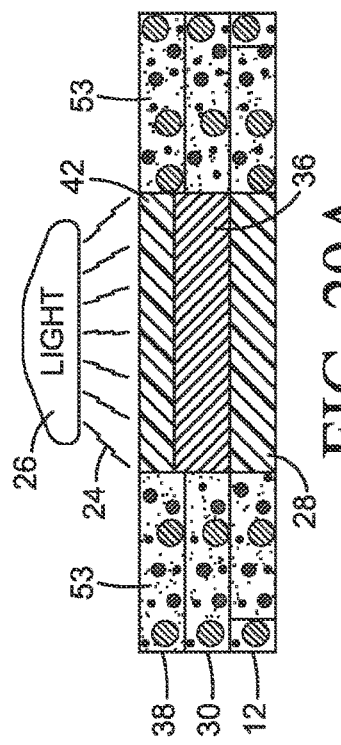
FIG. 29A

ADDITIVE MANUFACTURING

BACKGROUND

Additive manufacturing machines produce 3D (three-dimensional) objects by building up layers of material. Some additive manufacturing machines are commonly referred to as "3D printers" because they often use inkjet or other printing technology to apply some of the manufacturing materials. 3D printers and other additive manufacturing machines make it possible to convert a CAD (computer aided design) model or other digital representation of an object directly into the physical object.

DRAWINGS

FIGS. 1A-12A and 1B-12B present a sequence of sections and perspectives illustrating one example for additive manufacturing a composite object.

FIGS. 13 and 14 are flow diagrams illustrating examples of an additive manufacturing process.

FIGS. 15A-30A and 15B-30B present a sequence of sections and perspectives illustrating a second example for additive manufacturing a composite object.

The same part numbers designate the same or similar parts throughout the figures.

DESCRIPTION

Figure 13:
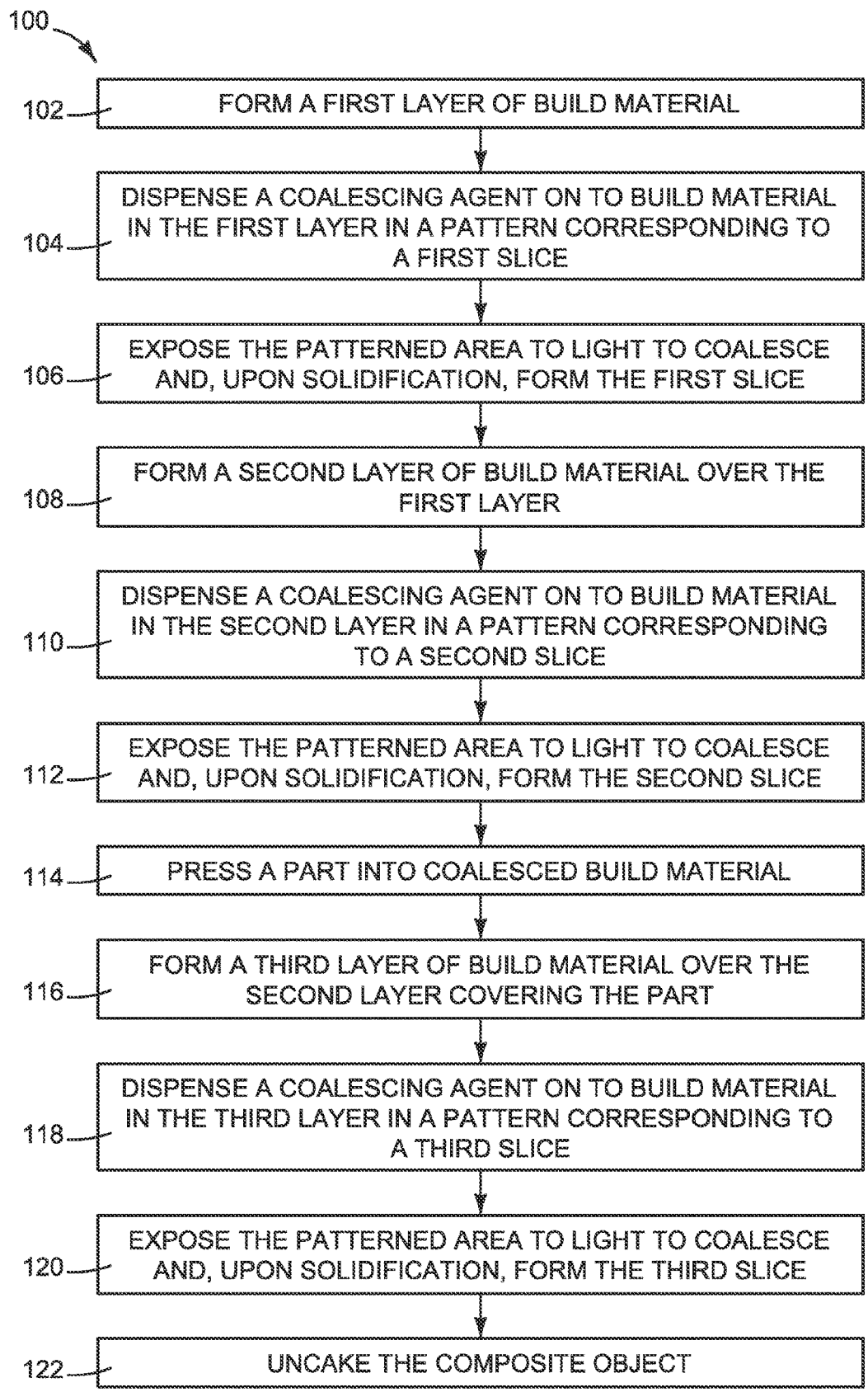

Some additive manufacturing machines make a 3D object by coalescing layers of powdered build material. Additive manufacturing machines make objects based on data in a 3D model created, for example, with a CAD computer program product. The model data is processed into slices each defining that part of a layer or layers of build material to be coalesced. The examples of additive manufacturing described below use a technique developed by Hewlett Packard Company called Multi Jet Fusion™ (MJF) in which a light absorbing ink or other suitable coalescing agent is "printed" on to a layer of build material in the desired pattern and then exposed to light to coalesce the patterned build material. MJF coalescing agents increase light absorption to generate sufficient heat to sinter, melt or otherwise coalesce the patterned build material for solidification directly (as in sintering) or indirectly through cooling (as in melting).

Polymers commonly used for additive manufacturing with MJF may not be appropriate to achieve the properties desired for some manufactured objects. Accordingly, a new process has been developed to expand the range of objects that may be manufactured with MJF by integrating discrete parts into the "printed" object. The resulting composite may be specially configured to achieve the desired properties including, for example, integrating ceramics for strength and metals for conductivity. In one example, an additive manufacturing process includes forming layers of powdered or other un-coalesced build material, coalescing build material in each layer, and embedding a part in the coalesced build material. The part may be pressed into molten build material in one or more layers and covered with succeeding layers, or the part may be placed on a layer of solid build material and covered with succeeding layers.

While examples of the new process may be implemented in different types of additive manufacturing systems, the new process is particularly well suited to MJF. MJF is an open air, layering process readily adapted to insert discrete parts at desired times and locations as the build material is layered and coalesced. Newly coalesced build material in each layer may remain molten long enough to press a discrete part into the still molten build material without added heating. If coalesced material has solidified before a discrete part is inserted, the insertion may be preceded by additional short heating to bring coalesced material to a molten state.

A processor readable medium with process instructions for building a composite with MJF or other additive manufacturing may be implemented, for example, in a controller for the additive manufacturing machine, in a CAD computer program product, or in an object model processor.

As used in this document: a "coalescing agent" means a substance that causes or helps cause a build material to coalesce; a "coalescence modifier agent" means a substance that inhibits or prevents solidification of a build material, for example by modifying the effect of a coalescing agent; and a "slice" means one or more slices of a multi-slice object.

The sequence of sections and perspectives presented in FIGS. 1A-12A and 1B-12B illustrate one example for manufacturing a composite object 10. (Composite 10 is shown in FIGS. 12A and 12B.) FIG. 13 is a flow diagram illustrating one example of an additive manufacturing process 100 implemented in FIGS. 1A-12A, 1B-12B. Referring to FIGS. 1A-12A, 1B-12B and 13, a first layer 12 of build material 14 is formed as shown in FIGS. 1A, 1B (block 102 in FIG. 13) and a coalescing agent 16 dispensed on to build material 14, as shown in FIGS. 2A, 2B, in a pattern 20 corresponding to an object slice, for example with an inkjet type dispenser 18 (block 104 in FIG. 13). Any suitable build material 14 may be used to make object 10, shown in FIGS. 12A and 12B, which may be hard or soft, rigid or flexible, elastic or inelastic. Also, while a powdered build material 14 is depicted by particles 22 in this example, suitable non-powdered build materials could also be used.

In FIGS. 3A, 3B, the area 20 of layer 12 patterned with coalescing agent is exposed to light 24 from a light source 26 to coalesce build material and, upon solidification, form a first object slice 28 (block 106 in FIG. 13). Depending on the characteristics of build material 14, coalescing agent 16 and light 24 applied to build material 14, the build material may coalesce, for example, by melting to a liquid or by sintering to a solid. If the build material melts, then solidification occurs upon cooling.

In FIGS. 4A-6A and 4B-6B, a second layer 30 of build material 14 is formed over first layer 12 (block 108 in FIG. 13), a coalescing agent 16 dispensed in a pattern 32 corresponding to a second object slice (block 110 in FIG. 13), and the patterned build material exposed to light 24 (block 112 in FIG. 13) to coalesce build material and, upon solidification, form a second object slice 34. Then, as shown in FIGS. 7A, 8A and 7B, 8B, a discrete part 36 is pressed into coalesced build material 34 (block 114 in FIG. 13). It may be desirable in some implementations to heat part 36 prior to contact with the build material to avoid any damaging thermal shock and to help keep the build material soft until the part is fully inserted. While the desired temperature for parts 36 may vary depending on the specific implementation, it is expected that heating part 36 to a temperature within ±5° C. of the melting point of the coalesced build material usually will be sufficient.

In one example, where the solidification of patterned build material occurs through melting and subsequent cooling, part 36 may be pressed into coalesced build material 34 while the build material is still molten. In another example, where the solidification of patterned build material occurs without melting (as in sintering) or the molten build material is allowed to cool and solidify before inserting a part 36, the solid build material may be heated to melting and part 36 pressed into the molten build material. It may also be possible, in another example, to press part 36 into solid build material where the part is hot enough to melt its way into the otherwise solid surrounding build material.

In FIGS. 9A-11A and 9B-11B, a third layer 38 of build material 14 is formed over second layer 30 covering part 36 (block 116 in FIG. 13), a coalescing agent 16 applied in a pattern 40 corresponding to a third object slice (block 118 in FIG. 13), and patterned build material exposed to light 24 (block 120 in FIG. 13) to coalesce build material and, upon solidification, form a third object slice 42. While distinct slices 28, 34, and 42 are shown in FIG. 11A, the adjoining slices actually fuse together into a single part upon coalescence and solidification. The fused slices 28, 34, and 42 with embedded part 36 are separated from the build material, in a process sometimes referred to as "uncaking", as a finished composite 10 shown in FIGS. 12A and 12B (block 122 in FIG. 13). While a simple three slice object 10 with a single embedded part 36 is shown, the same process may be used to form complex, multi-slice objects with more and varied parts 36.

In the example shown, part 36 is completely buried in build material. In other examples, it may be desirable to leave some or all of part 36 exposed. Also in the example shown, part 36 is about the same thickness as layer 30 and slice 34. In other examples, part 36 may be thicker or thinner than the layers of un-coalesced build material and/or the object slices. For MJF additive manufacturing processes such as the process illustrated in FIGS. 1A-12A, 1B-12B, and 13, the unwanted displacement of build material by part(s) 36 may be corrected by covering the displaced build material with succeeding layer(s) of build material and fusing the displaced material into the succeeding slice(s). Placing discrete parts 36 may be automated using conventional robotics, for example, to increase throughput and improve reproducibility. For MJF additive manufacturing, orientation and alignment of the robotics for part placement may be coordinated with or use the same system components that control printhead placement for dispensing coalescing agent.

FIG. 14 is a flow diagram illustrating another example of a process 130 for manufacturing a composite object 10. Referring to FIG. 14, multiple layers of un-coalesced build material are formed at block 132, for example as described above with reference to FIGS. 1A, 1B, 4A, 4B, 9A, and 9B. Build material in each layer is coalesced at block 134, for example as described above with reference to FIGS. 2A-3A, 2B-3B, 5A-6A, 5B-6B, 10A-11A, and 10B-11B. A part is embedded in coalesced build material at block 136, for example as described above with reference to FIGS. 7A-8A and 7B-8B.

Figure 30A:
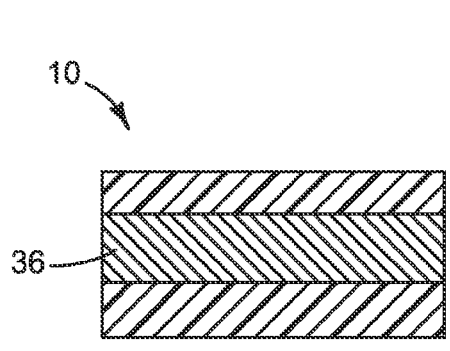
Figure 30B:
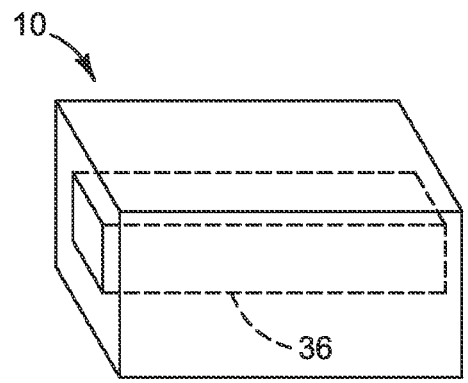
Figure 31A:
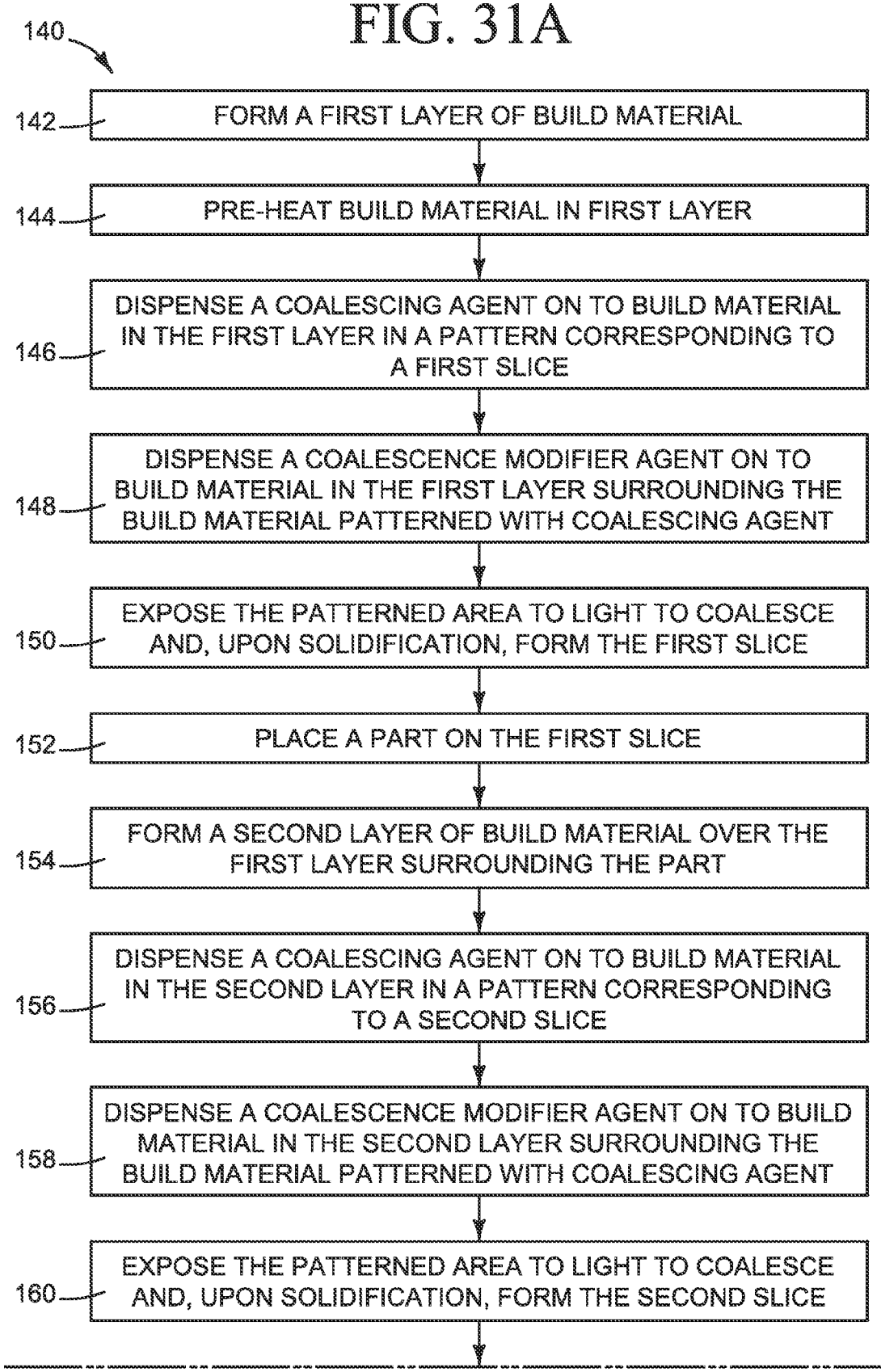
FIGS. 31A and 31B are a flow diagram illustrating another example of an additive manufacturing process.
Figure 31B:
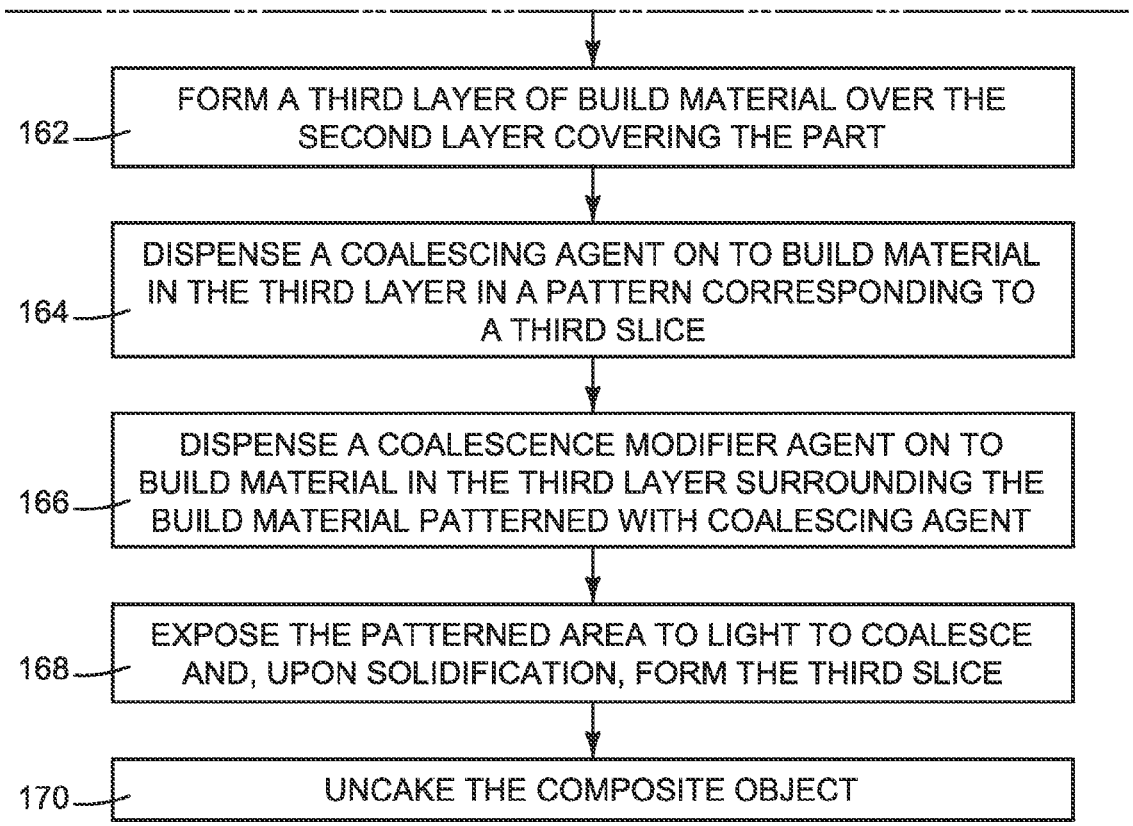

The sequence of sections and perspectives presented in FIGS. 15A-30A and 15B-30B illustrate a second example for manufacturing a composite object 10 (shown in FIGS. 30A and 30B). FIGS. 31A and 31B are a flow diagram illustrating one example of an additive manufacturing process 140 implemented in FIGS. 1A-12A, 18-12B. Referring to FIGS. 15A-30A, 15B-30B, and 31A, 31B, a first layer 12 of build material 14 is formed as shown in FIGS. 15A, 15B (block 142 in FIG. 31A). In some implementations, it may be desirable to pre-heat build material 14 in first layer 12 or in the first few layers to help keep each layer flat during coalescence and solidification. Individual layers of build material 14 may be pre-heated, as shown in FIG. 16A (block 144 in FIG. 31A), or build material 14 may be pre-heated in a supply reservoir before layering. Heater 44 may also be used to heat or re-heat solid build material to embed a part 36, as described above with reference to FIGS. 7A-8A and 7B-8B.

Figure 18A:
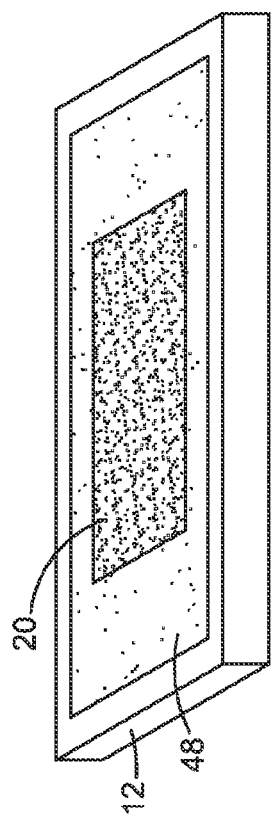
Figure 18B:
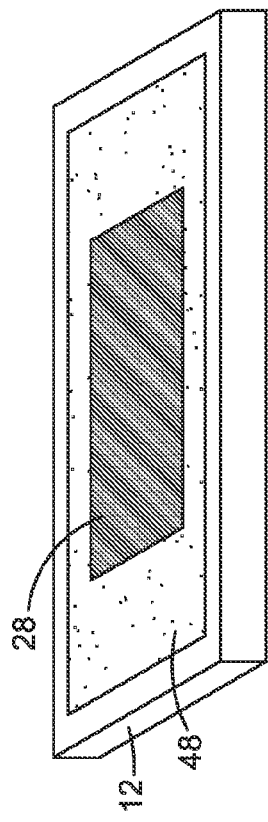

In FIGS. 17A, 17B, a coalescing agent 16 is dispensed on to build material 14 in a pattern 20 corresponding to an object slice, for example with an inkjet type dispenser 18 (block 146 in FIG. 31A). In FIGS. 18A, 18B, a coalescence modifier agent 46 is dispensed on to build material 14 in layer 12 covering an area 48 surrounding the pattern 20 of coalescing agent 16 (block 148 in FIG. 31A), for example with an inkjet type dispenser 50.

Coalescing agent may bleed into build material outside the desired pattern, causing unwanted coalescing of build material. Also, heat generated in the patterned build material can, under some circumstances, propagate into and coalesce surrounding, unpatterned build material. Unwanted coalescing of build material can degrade the overall dimensional accuracy and appearance of the manufactured object. Thus, a modifier agent that blocks or neutralizes the effects of the coalescing agent may be used to control unwanted coalescing of build material. Coalescence modifier agent 46 may be dispensed on to other areas of build material layer 14 to help define other aspects of the object slice, including interspersed with the pattern of coalescing agent to change the material characteristics of the slice. Although two distinct inkjet type dispensers 18, 50 are shown, agents 16 and 46 could be dispensed from dispensers integrated into a single device, for example using different printheads (or groups of printheads) in a single inkjet printhead assembly.

Figure 19A:
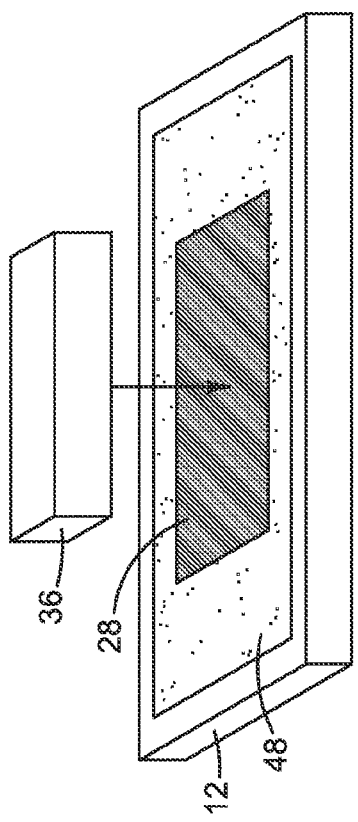
Figure 19B:
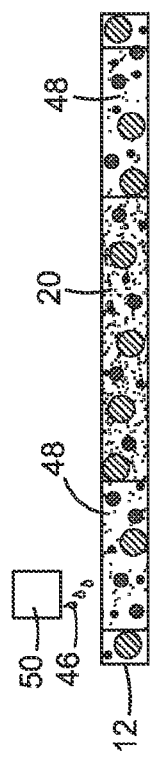
Figure 20A:
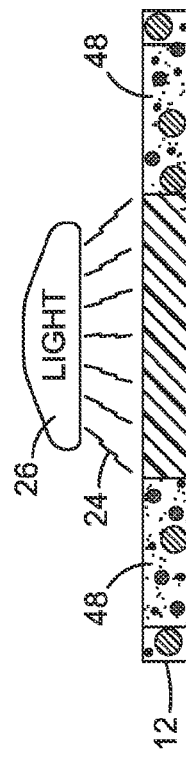
Figure 20B:

In FIGS. 19A, 19B, the area 20 of layer 12 patterned with coalescing agent is exposed to light 24 to coalesce build material and, upon solidification, form a first object slice 28 (block 150 in FIG. 31A). A discrete part 36 is placed on first slice 28, as shown in FIGS. 20A-20B and 21A-21B (block 152 in FIG. 31A). In FIGS. 22A, 22B, a second layer 30 of build material 14 is formed over first layer 12 surrounding part 36 (block 154 in FIG. 31A). In this example, part 36 is thicker than layer 30 and, thus, protrudes above the un-coalesced build material in layer 30. Part 36 could be the same thickness as layer 30 or thinner than layer 30. For a part 36 thinner than layer 30, a third layer/slice may not be necessary or desirable to cover part 36. It may be desirable in some implementations to heat part 36 prior to placement on slice 28 to avoid any damaging thermal shock to slice 28 or to build material 14 formed around part 36. As noted above, while the desired temperature for part 36 may vary depending on the specific implementation, it is expected that heating part 36 to a temperature within ±5° C. of the melting point of coalesced build material usually will be sufficient.

In FIGS. 23A, 23B, a coalescing agent 16 dispensed on to layer 30 in strips along two sides of part 36 in a pattern 32 corresponding to a second object slice (block 156 in FIG. 31A). In FIGS. 24A, 24B, a coalescence modifier agent 46 is dispensed on to build material 14 in layer 30 covering an area 52 surrounding the pattern 32 of coalescing agent 16 (block 158 in FIG. 31A). Build material patterned with coalescing agent is exposed to light 24 as shown in FIGS. 25A, 25B (block 160 in FIG. 31A) to coalesce build material and, upon solidification, form second object slice 34.

In FIGS. 26A-27A, 26B-27B, a third layer 38 of build material 14 is formed over second layer 30 covering part 36 (block 162 in FIG. 31B) and a coalescing agent 16 applied in a pattern 40 corresponding to a third object slice (block 164 in FIG. 31B). In FIGS. 28A, 28B, a coalescence modifier agent 46 is dispensed on to build material 14 in layer 38 covering an area 53 surrounding the pattern 40 of coalescing agent 16 (block 166 in FIG. 31B). Build material patterned with coalescing agent is exposed to light 24 as shown in FIGS. 29A, 29B (block 168 in FIG. 31B) to coalesce build material and, upon solidification, form third object slice 42. The now fused slices 28, 34, and 42 with embedded part 36 are uncaked from the build material as a finished composite 10 shown in FIGS. 30A, 30B (block 170 in FIG. 31B). In this example, part 36 is exposed at each end of object 10, for example to connect a conductive part 36 to external circuits.

Figure 32:
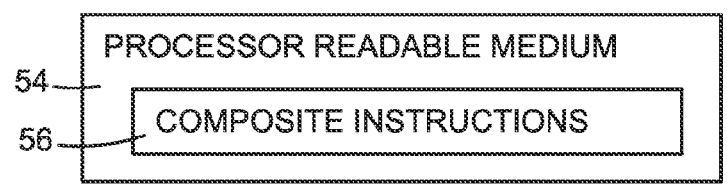
FIG. 32 is a block diagram illustrating one example of a processor readable medium with instructions to help form a composite object with an additive manufacturing machine.

FIG. 32 is a block diagram illustrating a processor readable medium 54 with instructions 56 to help manufacture a composite object such as an object 10 shown in FIGS. 12A, 12B and 30A, 30B. A processor readable medium 54 is any non-transitory tangible medium that can embody, contain, store, or maintain instructions for use by a processor. Processor readable media include, for example, electronic, magnetic, optical, electromagnetic, or semiconductor media. More specific examples of suitable processor readable media include a hard drive, a random access memory (RAM), a read-only memory (ROM), memory cards and sticks and other portable storage devices.

In one example, composite instructions 56 include instructions to partially or completely bury a discrete part in a single layer or in multiple layers of molten build material. In another example, composite instructions 56 include instructions to form layers of un-coalesced build material, coalesce build material in each layer, and embed a part in coalesced build material. Composite instructions 56 may include instructions embodying the example additive manufacturing processes described above with reference to FIGS. 13, 14 and 31A-31B (and the manufacturing sequences shown in FIGS. 1A-12A, 1B-12B and 15A-30A, 15B, 30B). Processor readable medium 54 with instructions 56 may be implemented, for example, in a CAD computer program product, in an object model processor, or in a controller for an additive manufacturing machine. Control data for manufacturing a composite object can be generated, for example, by processor readable instructions on the source application, usually a CAD computer program product, in an object model processor, or by processor readable instructions on the additive manufacturing machine.

Figure 33:
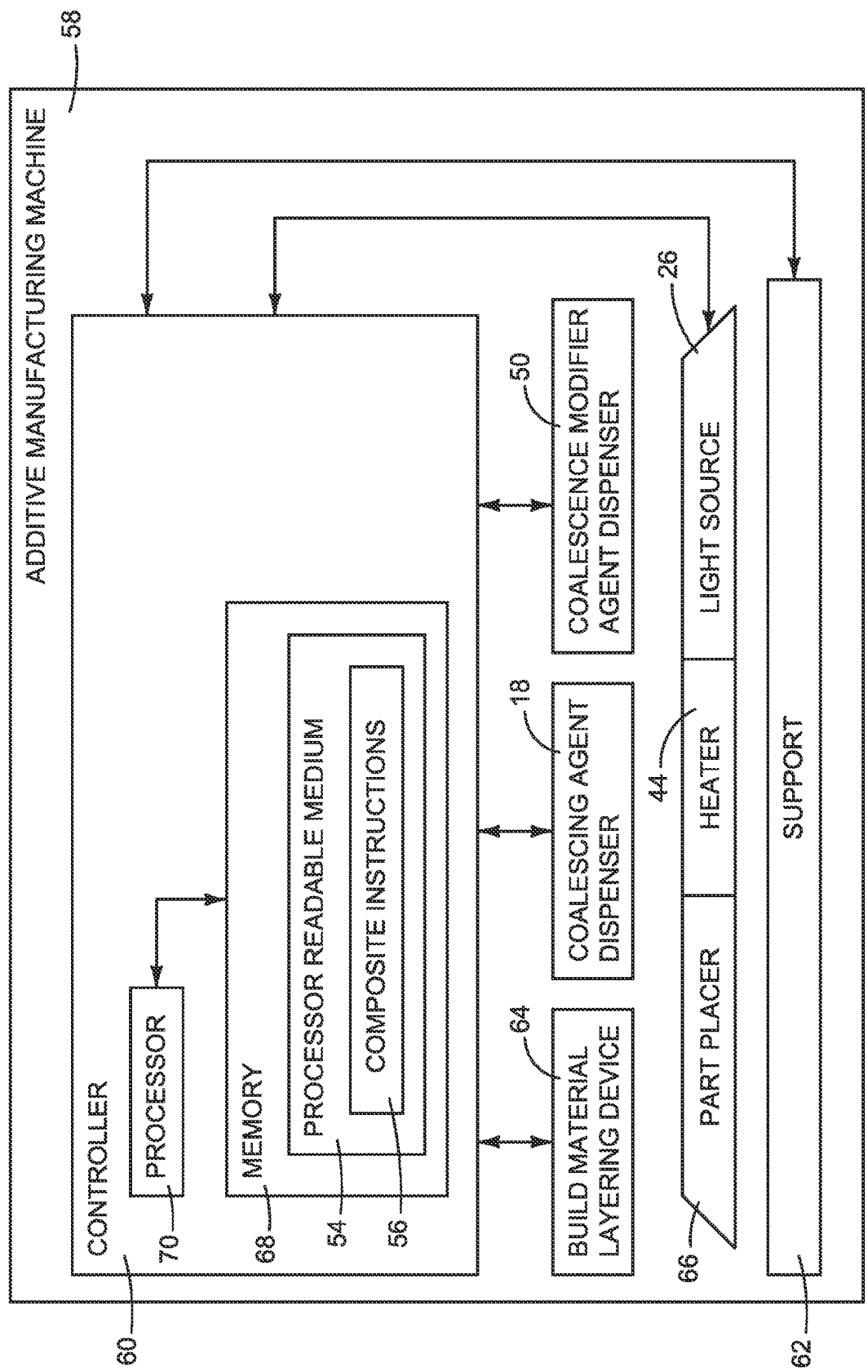
FIG. 33 is a block diagram illustrating one example of an additive manufacturing machine implementing a controller with a processor readable medium such as the medium shown in FIG. 32.

FIG. 33 is a block diagram illustrating an example of an additive manufacturing machine 58 implementing a controller 60 with composite instructions 56 on processor readable medium 54. Referring to FIG. 33, machine 54 includes controller 60, a manufacturing bed or other suitable support 62, a build material layering device 64, a coalescing agent dispenser 18, a coalescence modifier agent dispenser 50, a heater 44, and a light source 26. Machine 58 also includes a robotic device or other suitable system 66 for placing parts 36, for example as described above with reference to FIGS. 7A-8A, 7B-8B and 21A-22A, 21B-22B.

The in-process object structure is supported on support 62 during manufacturing. Also, in some machines 58, support 62 is movable to compensate for the changing thickness of the in-process structure, for example as layers of build material are added during manufacturing. Build material layering device 64 layers build material on support 62 and on underlying in-process structures and may include, for example, a device to dispense the build material and a blade or roller to distribute the build material uniformly to the desired thickness for each layer. Dispensers 18 and 50 dispense their respective agents selectively at the direction of controller 60, for example as described above with reference to FIGS. 13 and 31A-31B. While any suitable dispensers 18 and 50 may be used, inkjet printheads are often used in additive manufacturing machines because of the precision with which they can dispense agents and their flexibility to dispense different types and formulations of agents. Light source 26 applies light energy selectively at the direction of controller 60 to help coalesce build material treated with coalescing agent.

Controller 60 represents the processor (or multiple processors), the associated memory (or multiple memories) and instructions, and the electronic circuitry and components needed to control the operative elements of machine 58. In particular, controller 60 includes a memory 68 having a processor readable medium 54 with composite instructions 56 and a processor 70 to read and execute instructions 56. For example, controller 60 would receive control data and other instructions from a CAD program to make an object that includes an embedded part and execute local composite instructions 56 as part of the process of making the object.

Figure 34:
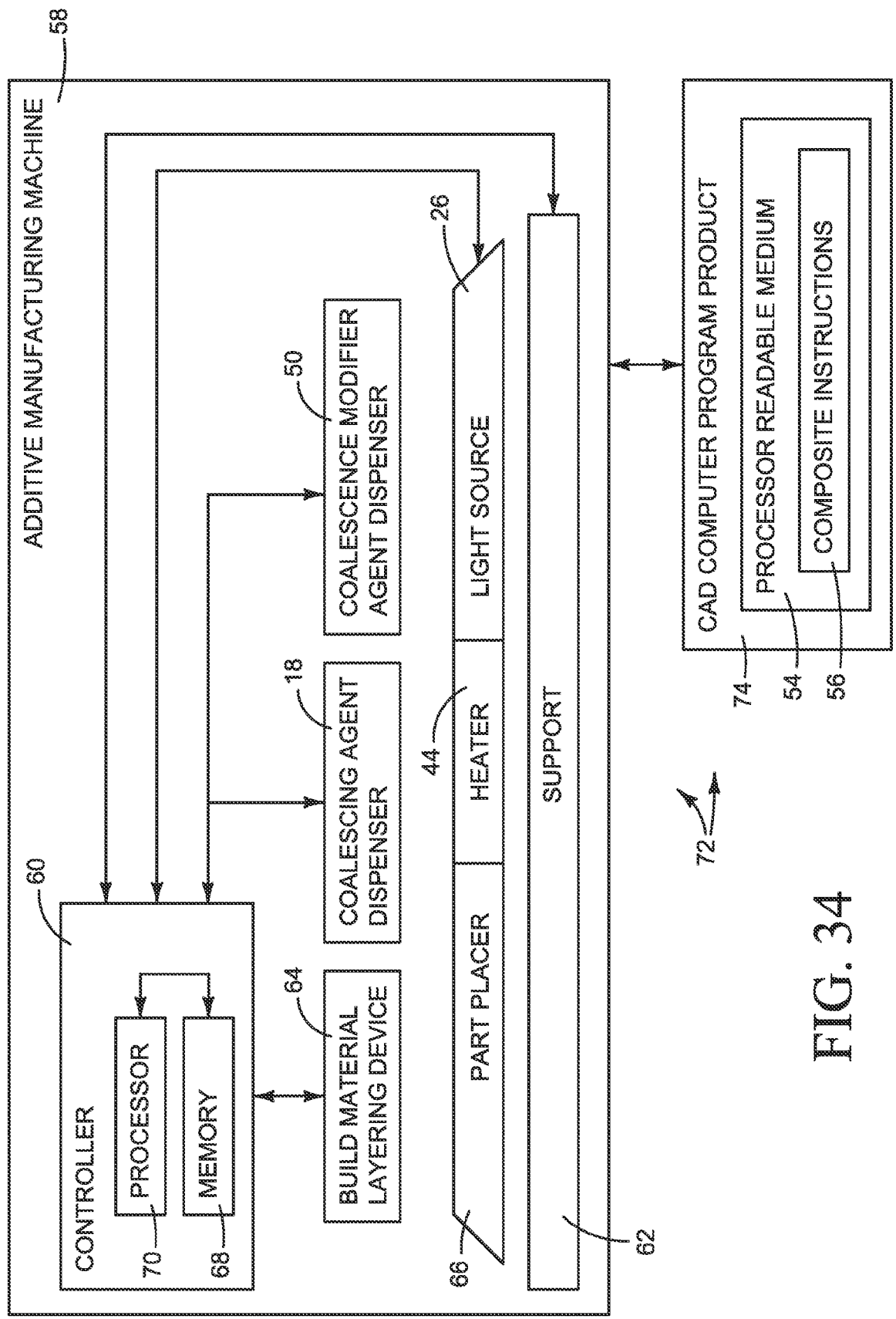
FIG. 34 is a block diagram illustrating one example of an additive manufacturing system implementing a CAD computer program product with a processor readable medium such as the medium shown in FIG. 32.

Alternatively, composite instructions 56 may be embodied in a processor readable medium 54 separate from controller 60, for example as part of a CAD computer program product shown in FIG. 34. Referring to FIG. 34, an additive manufacturing system 72 includes an additive manufacturing machine 58 operatively connected to a CAD computer program product 74 with composite instructions 56 residing on a processor readable medium 54. Any suitable connection between machine 58 and CAD program product 74 may be used to communicate instructions and control data to machine 58 including, for example, a wired link, a wireless link, and a portable connection such as a flash drive or compact disk.

As noted above, light source 26 applies light energy to build material to coalescence portions of the build material according to where coalescing agent has been delivered or has penetrated. In some examples, light source 26 is an infra-red (IR) or near infra-red light source, or a halogen light source. Light source 26 may be a single light source or an array of multiple light sources. In some examples, light source 26 is configured to apply light energy in a substantially uniform manner simultaneously to the whole surface of a layer of build material. In other examples, light source 26 is configured to apply light energy to only select areas of the whole surface of a layer of build material.

The combination of build material, coalescing agent, modifier agent, and light energy may be selected for an object slice so that (1) build material with no coalescing agent does not coalesce when the energy is applied, (2) build material with only coalescing agent coalesces when energy is applied, or (3) build material with both coalescing and modifier agents undergo a modified degree of coalescence with or without the application of energy.

The build material may be a powder, a liquid, a paste, or a gel. Examples of suitable build materials include semi-crystalline thermoplastics with a processing window of greater than 5° C. (i.e., the temperature range between the melting point and the re-crystallization temperature). Some specific examples of suitable build materials include polyamides such as nylon 12. Build material may include a single material or multiple materials with similarly sized particles or differently sized particles. The build material may also include a charging agent to suppress tribo-charging and/or a flow aid to improve flowability.

Suitable coalescing agents include water-based dispersions with an active, radiation absorbing binding agent. The active agent may be, for example, an infrared light absorber, a near infrared light absorber, or a visible light absorber. As one example, the coalescing agent may be an ink-type formulation including carbon black as the active material. An example of this ink-type formulation is commercially known as CM997A available from Hewlett-Packard Company. Examples of inks including visible light enhancers as the active agent are dye based colored ink and pigment based colored ink. Examples of pigment based inks include the commercially available inks CM993A and CEO42A, available from Hewlett-Packard Company. The aqueous nature of some coalescing agent enables the coalescing agent to penetrate the layer of build material. For hydrophobic build materials the presence of a co-solvent and/or a surfactant in the coalescing agent may assist in obtaining the desired wetting. One or more coalescing agent may be dispensed to form each slice.

Suitable coalescence modifier agents may separate individual particles of the build material to prevent the particles from joining together and solidifying as part of the slice. Examples of this type of coalescence modifier agent include colloidal, dye-based, and polymer-based inks, as well as solid particles that have an average size less than the average size of particles of the build material. The molecular mass of the coalescence modifier agent and its surface tension should be such that it enables the agent to penetrate sufficiently into the build material to achieve the desired mechanical separation. In one example, a salt solution may be used as a coalescence modifier agent. In other examples, inks commercially known as CM996A and CN673A available from Hewlett-Packard Company may be used as a coalescence modifier agent.

Suitable coalescence modifier agents may act to modify the effects of a coalescing agent by preventing build material from reaching temperatures above its melting point during heating. A fluid that exhibits a suitable cooling effect may be used as this type of coalescence modifier agent. For example, when build material is treated with a cooling fluid, energy applied to the build material may be absorbed evaporating the fluid to help prevent build material from reaching its melting point. Thus, for example, a fluid with a high water content may be a suitable coalescence modifier agent.

Other types of coalescence modifier agent may be used. An example of a coalescence modifier agent that may increase the degree of coalescence may include, for example, a plasticizer. Another example of a coalescence modifier agent that may increase the degree of coalescence may include a surface tension modifier to increase the wettability of particles of build material.

In one example, the modifier agent includes an inorganic salt, a surfactant, a co-solvent, a humectant, a biocide, and water. In some examples, the modifier agent consists of these components, and no other components. It has been found that this particular combination of components effectively reduces or prevents coalescence bleed, in part because of the presence of the inorganic salt. An inorganic salt used in the modifier agent has a relatively high heat capacity, but a relatively low heat emissivity. These characteristics render the modifier agent capable of absorbing the radiation (and its associated thermal energy) applied thereto, and also capable of retaining a bulk of the thermal energy therein. As such, very little, if any, of the thermal energy is transferred from the modifier agent to the build material.

In addition, the inorganic salt may also have a lower thermal conductivity and/or a higher melting point than the thermal conductivity and/or melting point of the build material and, in some instances, of the active material in the coalescing agent. Upon absorbing radiation and thermal energy, the inorganic salt does not melt, and also does not transfer a sufficient amount of heat to the surrounding build material. Therefore, the modifier agent can effectively reduce curing of the build material when build material is in contact with both the coalescing agent and the modifier agent, and prevent curing when the build material is in contact with the modifier agent alone.

"A" and "an" used in the claims means one or more.

The examples shown in the figures and described above Illustrate but do not limit the scope of the claimed subject matter which is defined in the following Claims.

What is claimed is:

1. An additive manufacturing process, comprising:
    forming a first layer of powdered build material;
    dispensing a coalescing agent on to powdered build material in the first layer in a pattern corresponding to a first object slice;
    dispensing a coalescence modifier agent on to powdered build material in the first layer surrounding build material patterned with coalescing agent;
    solidifying build material in the first layer patterned with coalescing agent to form the first object slice; then
    melting some or all of the first object slice;
    after melting some or all of the first object slice, pressing a part into melted first object slice wherein some of the melted first object slice is displaced by the part;
    forming a second layer of powdered build material on the first object slice and covering the part;
    dispensing a coalescing agent on to powdered build material in the second layer in a pattern corresponding to a second object slice;
    dispensing a coalescence modifier agent on to powdered build material in the second layer surrounding build material patterned with coalescing agent; and
    solidifying build material in the second layer patterned with coalescing agent to form the second object slice covering the part.

2. The process of claim 1, wherein the solidifying includes:
    exposing build material patterned with coalescing agent to light to melt the patterned build material; and
    cooling the melted build material or allowing the melted to build material to cool.

3. The process of claim 1, wherein the solidifying includes exposing build material patterned with coalescing agent to light to sinter the patterned build material.

4. The process of claim 1, wherein:
    forming a first layer of powdered build material includes forming multiple first layers successively one over another;
    dispensing a coalescing agent on to powdered build material in the first layer in a pattern corresponding to a first object slice includes dispensing a coalescing agent on to powdered build material in each of the successive first layers in a pattern corresponding to an object slice;

dispensing a coalescence modifier agent on to powdered build material in the first layer surrounding build material patterned with coalescing agent includes dispensing a coalescence modifier agent on to powdered build material in each of the successive first layers surrounding build material patterned with coalescing agent;

solidifying build material in the first layer patterned with coalescing agent to form the first object slice includes solidifying build material in each of the successive first layers patterned with coalescing agent to form each of multiple first object slices;

melting some or all of the first object slice includes melting some or all of the multiple first object slices; and pressing a part into melted first object slice includes pressing the part into melted multiple first object slices.

5. A tangible non-transitory processor readable medium having instructions thereon that when executed cause an additive manufacturing machine to:

form a first layer of powdered build material;

dispense a coalescing agent on to powdered build material in the first layer in a pattern corresponding to a first object slice;

dispense a coalescence modifier agent on to powdered build material in the first layer surrounding build material patterned with coalescing agent;

solidify build material in the first layer patterned with coalescing agent to form the first object slice; then melt some or all of the first object slice;

after melting some or all of the first object slice, press a part into melted first object slice wherein some of the melted first object slice is displaced by the part;

form a second layer of powdered build material on the first object slice and covering the part;

dispense a coalescing agent on to powdered build material in the second layer in a pattern corresponding to a second object slice;

dispense a coalescence modifier agent on to powdered build material in the second layer surrounding build material patterned with coalescing agent; and solidify build material in the second layer patterned with coalescing agent to form the second object slice covering the part.

6. The medium of claim 5, wherein the instructions to solidify include instructions to:

expose build material patterned with coalescing agent to light to melt the patterned build material; and cool the melted build material or allow the melted to build material to cool.

7. The medium of claim 5, wherein the instructions to solidify include instructions to expose build material patterned with coalescing agent to light to sinter the patterned build material.

8. An additive manufacturing machine controller that includes the processor readable medium of claim 5.

9. A computer program product that includes the processor readable medium of claim 5.

10. An additive manufacturing machine, comprising:

a first device to layer powdered build material;

a second device to dispense a coalescing agent on to powdered build material;

a third device to dispense a coalescence modifier agent on to powdered build material;

a light source to apply light energy to build material;

a fourth device to place parts;

a heater; and a controller to execute instructions to:

cause the first device to form a first layer of powdered build material;

cause the second device to dispense a coalescing agent on to powdered build material in the first layer in a pattern corresponding to a first object slice;

cause the third device to dispense a coalescence modifier agent on to powdered build material in the first layer surrounding build material patterned with coalescing agent;

cause the light source to apply light energy to build material in the first layer patterned with coalescing agent to form the first object slice; then cause the heater to melt some or all of the first object slice;

after melting some or all of the first object slice, cause the fourth device to press a part into melted first object slice wherein some of the melted first object slice is displaced by the part;

cause the first device to form a second layer of powdered build material on the first object slice and covering the part;

cause the second device to dispense a coalescing agent on to powdered build material in the second layer in a pattern corresponding to a second object slice;

cause the third device to dispense a coalescence modifier agent on to powdered build material in the second layer surrounding build material patterned with coalescing agent; and cause the light source to apply light energy to build material in the second layer patterned with coalescing agent to form the second object slice covering the part.

* * * * *